United States Patent [19]

Erlandsson et al.

[11] 4,003,264
[45] Jan. 18, 1977

[54] DEVICE FOR MEASURING AND REGISTERING OF SOUND

[75] Inventors: Bengt Erlandsson, Lund; Hakan Hakansson, Staffanstorp; Bengt Salén, Umea; Per Nilsson, Loddekopinge; Alf Ivarsson, Bjarred, all of Sweden

[73] Assignee: Shine Patent AB, Sweden

[22] Filed: Oct. 21, 1975

[21] Appl. No.: 624,446

[30] Foreign Application Priority Data

Oct. 24, 1974 Sweden .............................. 7413396

[52] U.S. Cl. ................................................. 73/557
[51] Int. Cl.² ........................................ G01H 3/12
[58] Field of Search ................... 73/556, 557, 558; 179/1 N

[56] References Cited

UNITED STATES PATENTS

| 3,545,564 | 12/1970 | Barber | 73/558 |
| 3,780,572 | 12/1973 | Rocha | 73/625 R |

FOREIGN PATENTS OR APPLICATIONS

| 1,497,739 | 9/1967 | France | 73/558 |
| 456,616 | 11/1936 | United Kingdom | 73/556 |

Primary Examiner—Richard C. Queisser
Assistant Examiner—John P. Beauchamp
Attorney, Agent, or Firm—Lerner, David, Littenberg & Samuel

[57] ABSTRACT

A device is shown for detecting and recording the presence of sound above specified predetermined levels during given time intervals. The circuit includes a microphone, a filter, an amplifier, level detectors, light emitting diodes and a photosensitive material.

6 Claims, 2 Drawing Figures

DEVICE FOR MEASURING AND REGISTERING OF SOUND

BACKGROUND OF THE INVENTION

The present invention relates to the measuring of noise or other sound and more specifically to a process for measuring noise or other sound for recording noise (sound) volumes above at least one selectable sound level, the noise being sensed and converted to an electric signal. Furthermore, the invention relates to a device for putting the process into effect.

Noise occurs in many places of work, particularly in industry, and is of a highly varying character both as regards intensity, duration and frequency distribution. Thus, noise may be permanent, intermittent or fluctuating in character, or may be in the nature of pulses.

Since it has been proved that too much noise will damage the human auditory organs and may also to some extent reduce hearing, there is a great need for measuring and recording noise in order to map sources of noise and above all in order to see to it that persons who work or live in noisy environments are not exposed to too much noise during too long a time.

According to the Swedish regulation (norm SEN 590111) the risk that a person will have his hearing damaged is depending on the total exposure or noise doses, i.e. the quantity of sound energy or noise, to which the person in question is exposed during one day. The noise dose is consequently a product of the noise intensity (sound energy) and the time of its duration (exposure time). Since this norm can only be applied strictly when the noise or sound level is constant, the norm also indicates a modified method of measuring the total exposure time for each occurring sound level (noise distribution analysis). By means of this additional method it is possible to evaluate the total noise quantities obtained for the sound levels in question in order to obtain a permanent average sound level corresponding from a risk viewpoint to the measured varying sound level during the same time. This value is called the equivalent continuous sound level and is expressed in dB(A).

Prior-art means for measuring noise exist of both the indicating and the recording type, and they may be stationary or portable. Preferably, such means are utilized as may be easily carried by the person who is the object of the noise measuring. For this purpose it is required that the device is so small that it will not hinder the person's normal activity.

Prior-art noise measuring means of the indicating type are provided with lamps or other indicating means, which are activated in dependence on the sound level reached at the measuring means in question. Means of the indicating type can only be used in order to indicate the sound level of the noise at the place where the measuring takes place and will only give a vague notion of how the sound level of the noise varies with the time, and do not indicate any recording of the measured noise quantity in relation to time.

Generally occurring noise measuring means of the recording type are so called noise dosimeters, of which there are several embodiments, preferably of a size which will fit in a breast pocket and having a noise sensing microphone arranged in such a way that it can be suspended near the carrier's ear. A common characteristic of these noise dosimeters is that they are based on a measuring of the noise dose, i.e. the quantity of noise to which a carrier is exposed during a determined time, for instance one day or one week. In that case the noise dose is measured by means of a summation process, viz. as the sound intensity multiplied by time, in which case an equivalent sound level is calculated by means of differential calculating means according to the formula:

$$L = 10 \log \frac{1}{T} \int_o^T I \cdot dt,$$

where $L$ indicates the equivalent sound level in dB(A)
$T$ indicates the measuring time
$I$ indicates the intensity of the noise in dB(A).

The recording of the calculated value is then carried out by means of various kinds of counters or counting mechanisms.

The measuring and recording of noise using dosimeters is a simplication and a rough approximation, since it does not give any possiblity of studying subsequently to what extent the recorded noise relates to different sound levels and consequently does not admit of any noise distribution analysis. According to SEN 590111 it is further indicated that a pulse sound having a sound level below 140 dB and having a duration of less than 25 msec will not be detrimental or dangerous to hearing. However, repeated pulse sounds, even if they are of a shorter duration than 25 msec, may no doubt cause damage to hearing.

A drawback in existing noise dosimeters is the time delay caused by the nature of the components of the dosimeters, which entails that sounds having a duration of less than 200 to 500 msec, e.g. hammer blows, cannot be recorded.

Another drawback of existing noise dosimeters is that the time duration, i.e. the time during which the measuring takes place, cannot be recorded but must be noted separately.

Yet another drawback of noise dosimeters is that they cannot be used internationally since the norms for the risks of hearing damage vary from country to country.

Thus, in Sweden it is assumed that a certain quantity of sound energy (noise dose = intensity multiplied by time) is equally detrimental to hearing, irrespectively of how long it lasts in time. This principle is called the equal energy principle and implies that if the noise lasts half the time, the sound intensity is allowed to be 3 dB higher. From this follows the concept $q = 3$. Thus, a noise dosimeter in Sweden should be constructed in order to give measuring results equivalent to $q = 3$. In the United States the norm applied is $q = 5$, which means an increase of 5 dB at the halving of the exposure time. There are also dosimeters recording sound pressure multiplied by time instead of sound energy multiplied by time. For such dosimeters $q$ is equal to 6, and values obtained by these dosimeters must therefore be corrected when a comparison is made with dosimeters for which $q$ is equal to 3. Obviously, therefore, there are considerable drawbacks in comparison with measuring results obtained by means of noise dosimeters.

There are, however, devices for measuring and recording noise which are independent of the q-norms of different countries and which may therefore be used internationally in order to calculate noise which will damage the hearing. These devices, which are meant for noise distribution and analysis, will store the time duration of the noise in different sound level classes and will thus give considerably nore information on the character of the noise, since it is possible to decide subsequently directly which sound level or levels have contributed most to the noise dose received.

Prior-art means for noise analysis are however highly complicated and consequently bulky. They are not, therefore, suitable for mobile measurings and particularly not for being carried by a person who goes about his normal daily duties.

The purpose of the present invention is to provide a process for measuring noise for recording said noise in order to make a noise distribution analysis at selectable sound levels, which process does not have the drawbacks mentioned above but is suitable for use at mobile measurings.

An additional purpose of the invention is to provide a device for putting the process into effect which is simple and inexpensive and which can be carried in a simple manner by a person in such a way as to give a correct measuring result without hindering the ordinary activity of the said person in any way whatever.

BRIEF DESCRIPTION OF THE INVENTION

The above purposes are achieved through a process of the kind mentioned by way of introduction. According to the invention the said process is characterized by the feature that the electric signal to which the sensed noise has been converted is caused to activate at least one circuit having an activation level specific for the said circuit and corresponding to the selected sound level, for activating a radiation generating element forming part of the circuit, and by the feature that radiation flux given off from the radiation generating element is allowed to actuate a recording element pertaining to each circuit and detecting and integrating the radiation flux, said recording element showing, at the end of the measuring, a value corresponding to the sensed noise quantity and lying about the said activation level.

The invention further proposes a device for putting the process into effect, said device comprising an element converting a noise to an electrical signal and being characterized by the feature that it comprises at least one circuit provided for transferring the electric signal and having on one hand a level detector adjustable for activation at selectable reference levels corresponding to desired sound levels and on the other hand a radiation generating element whichis adapted to be activated when the set reference level of the level detector is exceeded, and that each radiation generating element is correlated to a recording element separately detecting and integrating its radiation flux, whereby values of the sensed noise quantity above the set reference level and consequently of the sound level are obtained.

By utilizing radiation generating elements which are activated in dependence on the sound level of recorded noise and recording elements for recording the radiation flux given off by the radiation generating elements the device according to the invention can be provided with means for simultaneous recording to the time during which the measuring takes place. Thus, the device according to the invention can be provided with an additional circuit for recording the measuring time comprising a radiation generating element and a recording element of the same kind as those for recording the noise quantity.

The invention will be described in greater detail below with reference to the accompanying drawing in which:

DESCRIPTION OF THE DRAWINGS

In the two drawing Figures, elements having equal functions are provided with the same reference numeral.

DETAILED DESCRIPTION OF THE INVENTION

Figure 1:
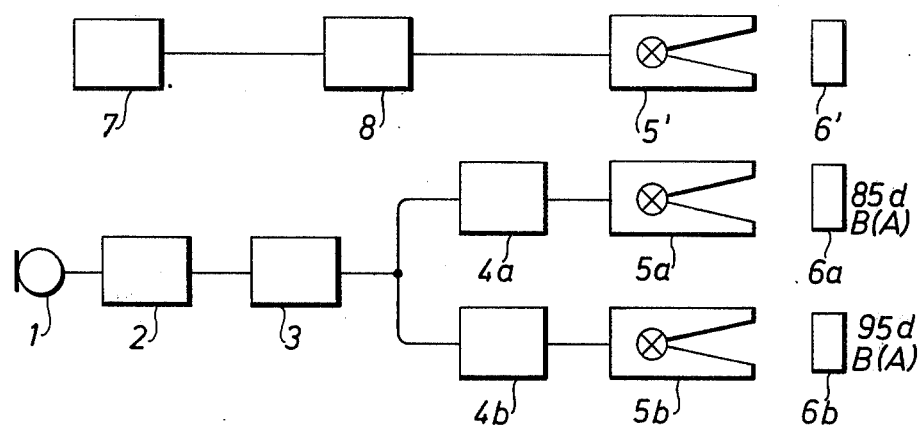
FIG. 1 shows a basic wiring diagram for a device according to the invention for recording noise with a resolution into two sound levels.

The device according to the invention shown in FIG. 1 by means of a basic wiring diagram is meant for measuring noise and recording it with a resolution of the sensed noise into two sound levels. It should be noted already here that except for the necessity of keeping the dimensions within limits there is no limitation with respect to the degree of resolution or the number of sound levels intended for recording with which the device can be provided. As shown by the Figure, noise is caught by means of a microphone 1 and is converted to an electric signal which, after filtration in a filter 2 and amplification in an amplifier 3, is supplied to the inputs of two parallel circuits. Each of these circuits comprises a level detector 4a, 4b having a post-connected radiation generating element 5a, 5b. The level detectors 4a, 4b are adjustable so as to be activated at the desired activation or reference levels corresponding to the sound levels with which it is desired to operate at the noise measuring. Thus, the level detector 4a can be set to a reference level corresponding to the sound level 85 dB(A) at the microphone 1, while the comparator 4b is set to be activated at a sound level of 95 dB($A$) at the microphone.

When the input signal to a leval detector 4a, 4b exceeds said set reference level it will let current pass to the subsequent radiation generating element 5a and 5b, respectively, which is thereby activated and gives off radiation. This radiation flux is adapted to be caught separately for each circuit on correlated recording elements 6a and 6b, respectively, in order to be detected there and to be accumulated in an integrating manner during the whole measuring time, whereby for each circuit there is obtained a recording of the noise quantity above the correlated activation level of the circuit.

According to the invention there are also included means for recording how long the device for noise measuring and recording has been in operation. Thus, the wiring diagram according to FIG. 1 shows that the device according to the invention contains and additional circuit with a switch 7, a battery 8 and an additional radiation generating element 5', which is adapted to co-operate with a recording element 6' in the same manner as the previously mentioned radiation generating elements 5a and 5b. The additional circuit is meant to be closed by means of the switch when the noise measuring and recording is begun, whereby the battery 8 supplies current to the radiation generating element 5', which is thereby activated and is kept activated as long as the apparatus is switched on. As the radiation generating element 5', like other radiation generating elements 5a, 5b gives off an essentially constant radiation flux when activated, there will be generated on the correlated recording element 6' a recording which is a measure of the time during which the measuring has taken place.

Figure 2:
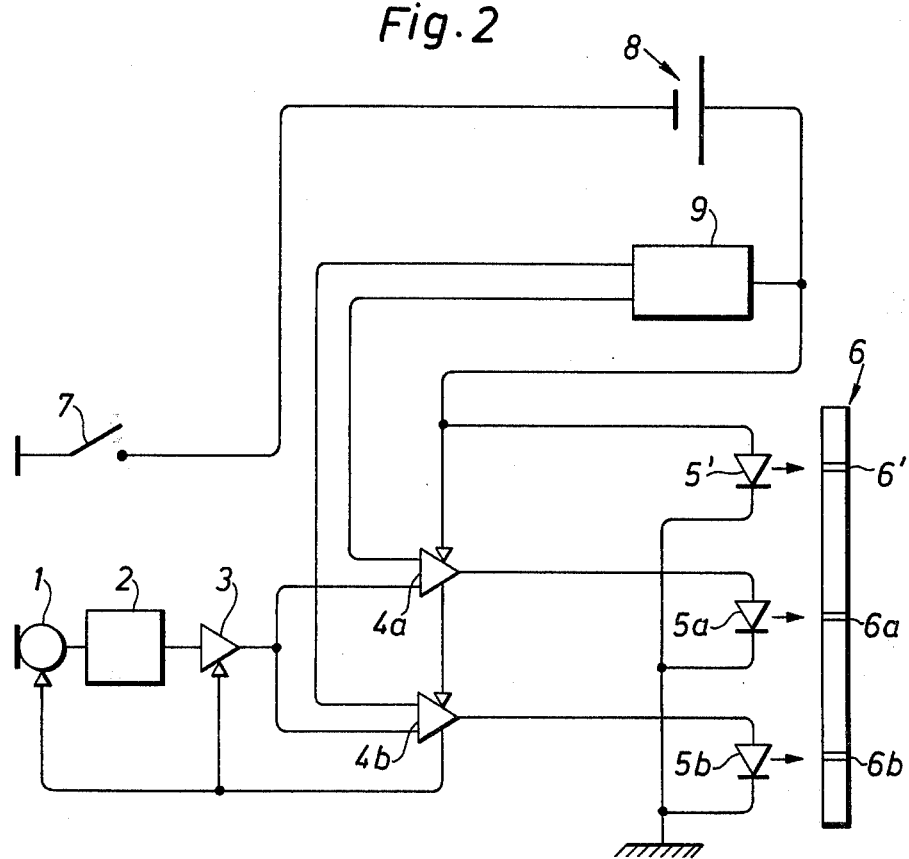
FIG. 2 shows a wiring digram for a preferred embodiment of the device according to the invention, said embodiment being also intended for recording noise at two sound levels.

FIG. 2 is a diagrammatic view of a preferred embodiment of a device according to the invention with recording of noise with a resolution into two different sound levels, the utilized radiation generating elements consisting of light emitting diodes and the recording elements consisting of one continuous film strip having a sensitivity within the range of wavelengths of the radiation emitted by the light emitting diodes. FIG. 2 further shows how the various elements forming part of the device may be exposed and connected in relation to each other.

Similarly to the device shown in FIG. 1, the device according to FIG. 2 comprises on one hand an input circuit with a microphone 1, the filter 2 and the amplifier 3, and on the other hand two post-connected circuits intended for resolution of noise at various sound levels and each having one level detector 4a, 4b and radiation generating elements 5a, 5b. In this case the level detectors consist of comparators 4a, 4b while the radiation generating elements, as mentioned above, consist of light emitting diodes 5a, 5b.

Even if the recording elements correlated to the light emitting diodes in each circuit can be embodied in different manners it is preferred to have an embodiment with a single continuous film 6 which is sensitive to the light given off by the light emitting diodes and having recording area 6a, 6b which are carefully delimited from each other, said film being arranged in light-proof relation to the light emitting diodes in order that light from the surroundings may not affect the recording.

As a result of the light flow given off by the light emitting diodes 5a and 6b to the light sensitive film, the said film is exposed at the recording areas 6a and 6b, respectively, and the illumination time will be directly proportional to the time during which the said comparators 4a and 4b, respectively, are activated, i.e. to the time during which the noise caught exceeds the reference levels set at the level detectors and corresponding to the desired sound levels.

The light emitting diodes 5a, 5b are adjusted in such a way to the comparators 4a and 4b, respectively, and to the operating voltages utilized that as soon as the correlated comparator allows current to pass, the light emitting diode will give off a light flux of essentially constant intensity irrespectively of whether the input signal to the comparator increases. However, if the input signal sinks below the reference level of the comparator, the pertaining light emitting diode is extinguished immediately.

The two light emitting diodes 5a and 5b are screened off from each other by means of shutters so that they can only co-operate with the respective pertaining registration area 6a and 6b, respectively.

During the time when the measuring goes on and provided that the input signal to the comparators is sufficiently high to activate one of these, there is consequently obtained a recording of noise having an intensity or sound energy in excess of the reference levels set at the comparators and corresponding to the sound levels, a distribution of the noise taking place in dependence on its sound level.

After the measuring and recording of the noise has terminated, for instance after a working day, the film 6 is developed and a blackening of the film proportional to the illumination time will constitute the final recording of each reference level set at a comparator and corresponding to the desired sound level. Since the degree of blackening is proportional to the illumination time and to the intensity of the light flux, the said intensity being constant for the light emitting diode in question, the blackening of the film is a direct measure of the quantity of noise which exceeds the reference level set at the said comparator and corresponding to the desired sound level.

The embodiment shown here also comprises a time measuring circuit having a switch 7, a battery 8 and an additional light emitting diode 5'. The light sensitive film 6 is adapted to be illuminated by the light emitting diodes 5', 5a, 5b over the separate recording areas 6', 6a and 6b, respectively, on the film in order to give a recording corresponding to the time of operation of each light emitting diode.

The recording areas 6', 6a and 6b of the film are read off after the measuring has been terminated by measuring the degree of blackening by means of a densitometer or the like, a time value being obtained for each recording area in comparison with known degrees of blackening. By means of a nomogram or a special slide rule it is then possible to calculate the corresponding noise index in a known manner for each sound level set and a total noise index obtained after summation can be set in relation to the measuring time.

The filter used in the device according to the invention is preferably conventional A-weighing filter since the ear is considerably less sensitive to noise in the low-frequency region. However, if desired, all kind of filters may be used permanently or after exchange for short periods of time. Such other filters are for instance octave band or tierce band filters.

The amplifier 3 is preferably a logarithmic amplifier but it may also be an amplifier of another type.

The microphone 1, whichis prefereably of the ceramic type, is adapted to meet the specifications according to the requirements of frequency operation and dynamics, and is provided with means for storing informtion of the exceeding of the highest sound level.

The device for noise measuring and recording according to FIG. 2 also comprises an adjusting means 9 built of variable resistors for adjusting the reference level of the comparators 4a, 4b. The adjusting means 9 has its input connected to the battery 8 while supplying bias voltages via separate outputs to the setting input of each comparator.

Furthermore, in the embodiment according to FIG. 2 the comparator 4a, 4b, the amplifier 3 and the microphone 1 obtain their current supply from battery 8 via one and the same conductor. The switch 7 is utilized in order to activate all active elements inthe device according to the invention. The amplifier 3 is further provided with means (not shown) for adjusting its amplification.

The device according to the invention can be embodied with such small dimensions that it can be placed at the ear, for instance suspended over it in the same manner as the rear portion of a spectacle frame bow. In such a case the microphone part is adapted to be placed at the concha of the ear, the switch 7 which is part of a microphone portion being arranged in such a way in the microphone suspension that the noise measuring device will be automatically switched on when the microphone is placed in the concha of the ear. In the device according to FIG. 2 the light emitting diodes are shown together with a film, the adjusting means of the comparators and the batteries arranged one above the other. These elements may in practice be housed in one and the same measuring cassette which may be exchangeably introduced into the casing of the measuring and recording device. The said measuring cassette may also contain a variable resistor for adjusting the amplification of amplifier 3. When the recording has been completed the measuring cassette is withdrawn and the film is taken out to be developed. The cassette may then be reloaded for use after being checked or after having the battery exchanged.

The means according to the invention for measuring and permanently recording noise may be embodied with an arbitrary number of circuits in order to give the desired resolution or distribution into sound levels of sensed noise.

Even if the device is given a miniaturized embodiment by using integrated circuit technology it is advisable, in order to keep the dimensions small, to limit the number of circuits for resolving the noise into sound levels, since the dimensions of the device will increase very much when the number of light emitting diodes increases. However, it is possible to use several different measuring cassettes having different pre-set reference levels for the comparators. A preferred embodiment of the device according to the invention comprises two circuits for noise according to sound levels and one circuit for indicating the measuring time. In that case a measuring cassette comprises three light emitting diodes with shutter, a film, an adjusting means with preadjusted bias voltages for the comparators and, in addition, two mercury cells of 1.4 V for operating the device.

In order to permit recording of the entire sound level spectrum which is of interest it is suggested that each device be provided with at least four different measuring cassettes embodied in such a way as to permit recording of noise above sound levels 85 dB(A) and 95 dB(A) as well as the measuring time sound levels 90 dB(A) and 100 dB(A) as well as the measuring time sound levels 105 dB(A) and 115 dB(A) as well as the measuring time sound levels 110 dB(A) and 120 dB(A) as well as the measuring time.

In additon, film intended for recording may have two different degrees of sensitivity, one meant for noise recording during a working day and a less sensitive film intended for noise recording during a whole week.

For purposes of calibration the device may further be provided with a calibration or service cassette which differs from the previously mentioned measuring cassettes in that the film has been removed and that all light emitting diodes are optically calibrateable from outside.

Additional accessories for the device according to the invention are an acoustic calibrator and, as mentioned above, means for reading off the recording results. From the above it will be apparent that the device according to the invention can be given very small dimensions, for which reason it may be placed directly at an er. Thus, the device may be given such a shape that it can be placed over the carrier ear. Since the device has such small dimensions it can be carried without difficulty inside an ear protecting cap in order to give the correct value of the noise which will hit the carrier's hearing organs. Furthermore, the device according to the invention may be built into the ear protecting cap itself.

In addition to the advantages mentioned above it may be noted that the device for measuring and recording noise according to the invention has very short time delay because the components having a very short response time are used. Thus, it is possible to record pulse light having a duration of down to 0.1 msec with the aid of the embodiment according to FIG. 2.

The invention has been described above with respect to a preferred embodiment. The radiation generating elements proposed are light emitting diodes and the proposed recording elements detecting the radiation is a film sensitive to radiation. Furthermore, the proposed level detectors are comparators.

Of course, instead of these and other elements it is possible to utilize other elements having the function connected with the elements in question. Thus, the radiation generating elements may consist of current saving lamps. The recording elements may consist of any type of radiation recording and integrating elements which may be read off subsequently.

Furthermore, the circuit shown in FIG. 2 for connecting the various elements in the device according to the invention may also have another appearance, which is of course dependent of the components utilized for each specific purpose.

What is claimed is:
1. An audio dosimeter comprising:
 a. means for sensing sound and producing an electrical signal having an amplitude which is related to the level of the sensed sound;
 b. means including a first comparator for producing a first switching signal as long as the amplitude of said electrical signal exceeds a first predetermined level;
 c. means including a second comparator for producing a second switching signal as long as the amplitude of said electrical signal exceeds a second predetermined level which is higher than said first predetermined level;
 d. at least two light emitting diodes;
 e. means for energizing one said light emitting diodes in response to the presence of said first switching signal so that it produces a light flux of essentially constant intensity regardless of by how much the amplitude of said electrical signal exceeds said first predetermined level;
 f. means for energizing the other of said light emitting diodes in response to the presence of said second switching signal so that it produces a light flux of essentially constant intensity regardless of by how much the amplitude of said electrical signal exceeds said second predetermined level; and
 g. a single piece of film arranged in light-proof relation to said light emitting diodes for individually and separately recording the light emitted by said light emitting diodes, said film recording light pulses of as short as 0.1 millisecond thereon.

2. An audio dosimeter according to claim 1, further comprising means for actuating said audio dosimeter, a third light emitting diode, means for energizing said third light emitting diode whenever said audio dosimeter is activated, and wherein said film is arranged in lightproof relation to said third light emitting diode for individually and separately recording the light emitted by said third light emitting diode to provide a record of the total time that the said single piece of film is in said audio dosimeter and said audio dosimeter is activated.

3. An audio dosimeter according to claim 1, wherein said means for sensing sound and producing an electrical signal includes an A-weighing filter.

4. An audio dosimeter according to claim 2, wherein said means for sensing sound and producing an electrical signal includes an A-weighing filter.

5. An audio dosimeter comprising:
   a. means for sensing sound and producing an electrical signal having an amplitude which is related to the level of the sensed sound;
   b. means including a comparator for producing a first signal when the amplitude of said electrical signal exceeds a predetermined level;
   c. means for actuating said audio dosimeter;
   d. at least two light emitting diodes;
   e. means for energizing one of said light emitting diodes in response to the presence of said first signal so that it produces a light flux of essentially constant intensity regardless of how much the amplitude of said electrical signal exceeds said predetermined level;
   f. means for energizing said second light emitting diode whenever said autio dosimeter is activated; and
   g. a single piece of film arranged in lightproof relation to said light emitting diodes for individually and separately recording the light emitted by said light emitting diodes including light pulses of as short as 0.1 millisecond to provide a record of the total time the sound exceeds said predetermined level and the total time that the said single piece of film is in said audio dosimeter and said audio dosimeter is activated.

6. An audio dosimeter according to claim 5, wherein said means for sensing sound and producing an electrical signal includes an A-weighing filter.

* * * * *

UNITED STATES PATENT OFFICE
CERTIFICATE OF CORRECTION

Patent No. 4,003,264      Dated January 18, 1977

Inventor(s) Bengt Erlandsson; Hakan Hakansson; Bengt Salen; Per Nilsson; and Alf Ivarsson It is certified that error appears in the above-identified patent and that said Letters Patent are hereby corrected as shown below:

Column 3, line 42, the word "about" should read -- above --.
Column 7, line 66, please correct "er" to read -- ear --.

Signed and Sealed this

Fifth Day of April 1977

[SEAL]

Attest:

RUTH C. MASON
*Attesting Officer*

C. MARSHALL DANN
*Commissioner of Patents and Trademarks*